Oct. 12, 1926.

D. E. ERICKSON 1,603,004

FILTER

Filed July 5, 1923     4 Sheets-Sheet 1

INVENTOR
D.E.Erickson
by Langner, Parry, Card + Langner
Attys.

Oct. 12, 1926.

D. E. ERICKSON 1,603,004

FILTER

Filed July 5, 1923      4 Sheets-Sheet 2

INVENTOR
D.E.Erickson
by Langner, Parry, Card & Langner
Attys.

Oct. 12, 1926.

D. E. ERICKSON

FILTER

Filed July 5, 1923

INVENTOR
D.E.Erickson
by Langner, Parry, Card & Langner
Attys.

Oct. 12, 1926.  
D. E. ERICKSON  
1,603,004  
FILTER  
Filed July 5, 1923    4 Sheets-Sheet 4

INVENTOR  
D. E. Erickson  
by Langner, Parry, Card & Langner  
Attys.

Patented Oct. 12, 1926.

1,603,004

UNITED STATES PATENT OFFICE.

DANIEL EMIL ERICKSON, OF LONDON, ENGLAND, ASSIGNOR TO TODD SHIPYARDS CORPORATION, OF NEW YORK, N. Y.

FILTER.

Application filed July 5, 1923, Serial No. 649,663, and in Great Britain April 27, 1923.

This invention relates to filters and has particular reference to duplex filters such as are used in filtering oil or other liquid during its continuous supply under pressure or suction to oil burners or other apparatus. The chief object of the present invention is to provide a filter that is foolproof, simple in operation and construction, and relatively inexpensive.

With the above object in view and such others as are incidental thereto or hereinafter appear the invention in one of its aspects may be regarded as comprising a plurality of cylinders each having an inlet port and an outlet port, a strainer in each cylinder two conical plug valves each resiliently held in its seating and a single operating lever whereby a single manipulation of the valves changes the travel of the liquid to be filtered from passing through one of the cylinders to passing through the other cylinder. The conical plug valves may be arranged coaxially and mutually converging and are also preferably arranged to be partially hydraulically balanced.

In the simplest form of the invention the passages to and from two cylinders are controlled by two simultaneously operated conical plug cocks or valves so that when one is rendering a cylinder and strainer idle the other cylinder and strainer are simultaneously being rendered active. These cocks or valves are preferably geared or otherwise positively connected to a single gear wheel or other element on the spindle of the lever arm control bar which is arranged to normally occupy one or other of two extreme positions.

In one convenient construction and arrangement the conical valves are hollow conical double-ported plug valves co-axially arranged with their smaller ends towards one another. The juxtaposed smaller ends of these plug cocks are closed and may be formed as bevel gear wheels meshing with a single intermediate bevel wheel mounted on a manually controlled spindle.

By permitting the oil or other liquid under control to act upon both sides of the plug cocks the liquid pressure upon them is partly balanced and no difficulty is experienced in making them turn in their conical seatings.

In order to keep the plug cocks well seated they may advantageously be drawn towards one another by a spring controlled bolt and nut or equivalent yielding connection.

In order that the invention may be clearly understood and readily carried into effect the same will now be described more fully with reference to the accompanying drawings which illustrate one practical embodiment. In these drawings:—

The filter as shown comprises the two cylinders A and B arranged side by side as a single casting. The cylinder A has an inlet port $A^1$ near the top and an outlet port $A^2$ angularly displaced axially of the cylinder with reference to port $A^1$ near the bottom. Similarly the cylinder B has an inlet port $B^1$ near the top and an outlet port $B^2$ angularly displaced axially of the cylinder with reference to port $B^1$ near the bottom. The cylinders have internal shoulders $A^3$ $B^3$ respectively to serve as seatings for the open ends of the filters X which extend downwardly and form an annular space or chamber between them and the internal walls of the cylinders.

Set in horizontal alignment in a vertical plane at right angles to the vertical plane common to the two cylinders are two hollow plug cocks C and D fitting in appropriate conical seatings in the casting. The plug cocks C and D each have two ports $C_1$ $C_2$ and $D_1$ $D_2$ respectively capable of registering with either of two passages E G and F H leading from ports $E_1$ $G_1$ and $F_1$ $H_1$ respectively in their conical seatings to two of the ports namely $A^1$ $B^1$ and $A^2$ $B^2$ respectively in the cylinders. The arrangement of these ports and passages is such that when filtering through the cylinder A the oil or other liquid to be filtered which enters the filter through pipe T passes from the interior of the inlet plug cock C through the port $C_1$ therein and along the passage E to the inlet port $A^1$ of the cylinder A. After passage through the cylinder by way of the strainer therein the oil or other fluid passes through the outlet port $A^2$ of cylinder A and along the passage F and through the port $D_1$ of the outlet plug cock D to the interior of this plug cock whence it leaves the filter by the pipe U. Meanwhile the other ports and passages and the cylinder B are idle since the ports $C_2$ $G_1$ and $D_2$ $H_1$ are not in coincidence and hence no liquid can pass therethrough into cylinder B and the strainer in this cylinder can if desired be removed and cleaned.

In the alternative position of the plug cocks that is to say when the plug cocks C and D have been operated by the mechanism to be hereinafter described so as to bring the ports $C_2$ $G_1$ and $D_2$ $H_1$ into coincidence the liquid passes from pipe T through the port $C_2$ of cock C, port $G_1$ along passage G to port $B^1$ in cylinder B and returns from this cylinder by way of port $B^2$, passage H, port $H_1$ and port $D_2$ of the plug cock D to the outlet pipe U. In this position of the plug cocks the ports $C_1$ $E_1$ and $D_1$ $F_1$ are not in coincidence and the strainer in cylinder A can be removed and cleaned.

Figure 1:
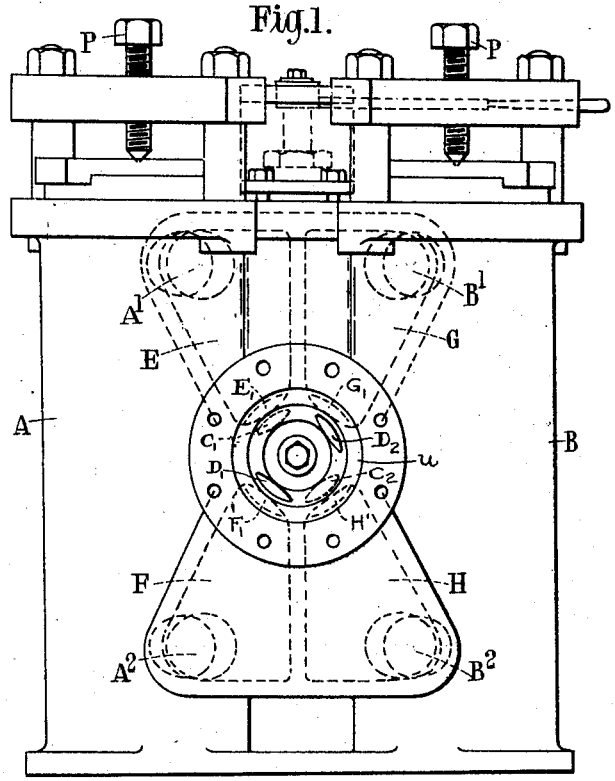
Figure 1 is a side elevation of the improved filter.
Figure 2:
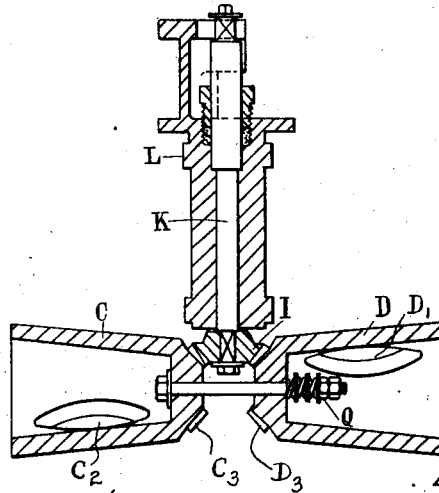
Figure 2 is a sectional elevation of the plug cocks and their operating gear removed from their normal position in the filter.
Figure 3:
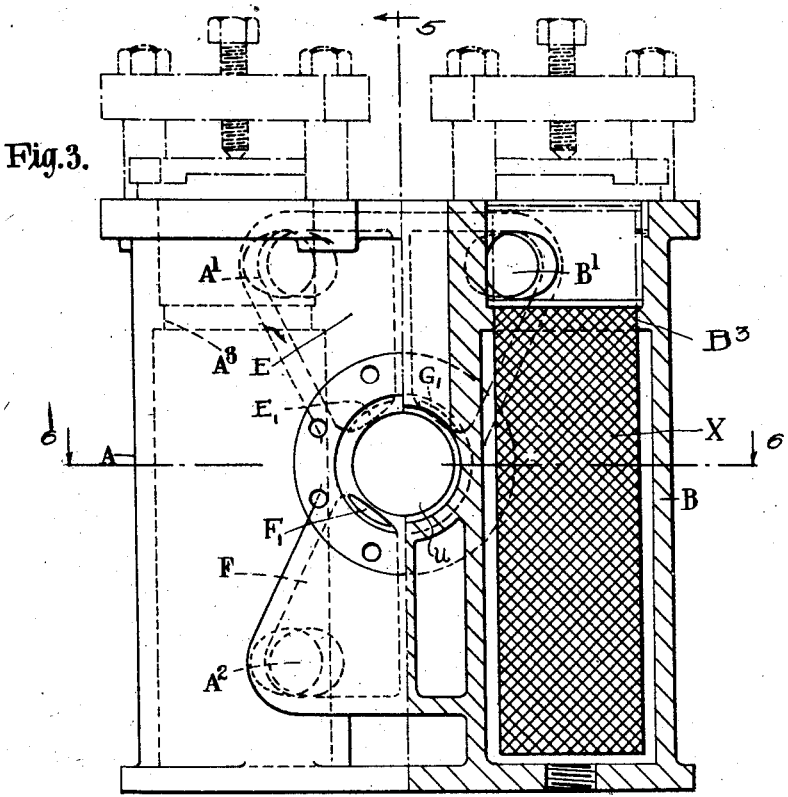
Figure 3 is a half elevation, half sectional elevation
Figure 4:
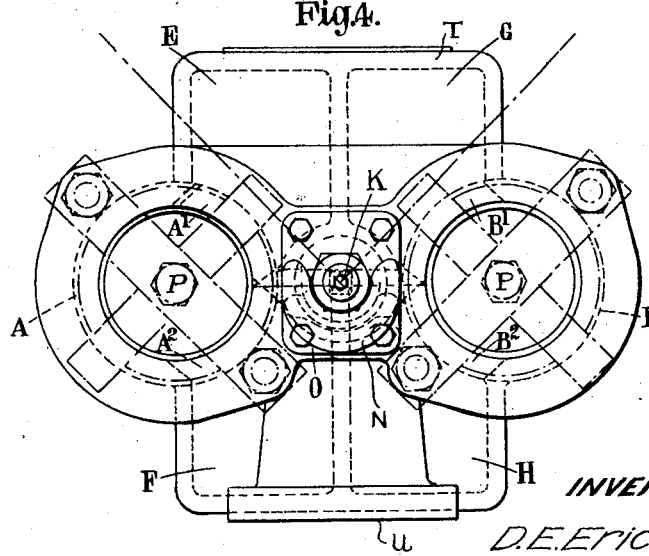
Figure 4 is a plan of the same filter.
Figure 5:
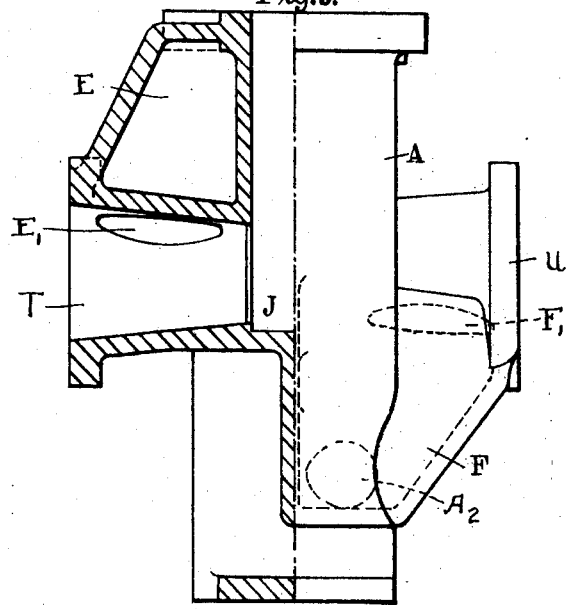
Figure 5 is a sectional elevation on the line 5—5 of Figure 3
Figure 6:
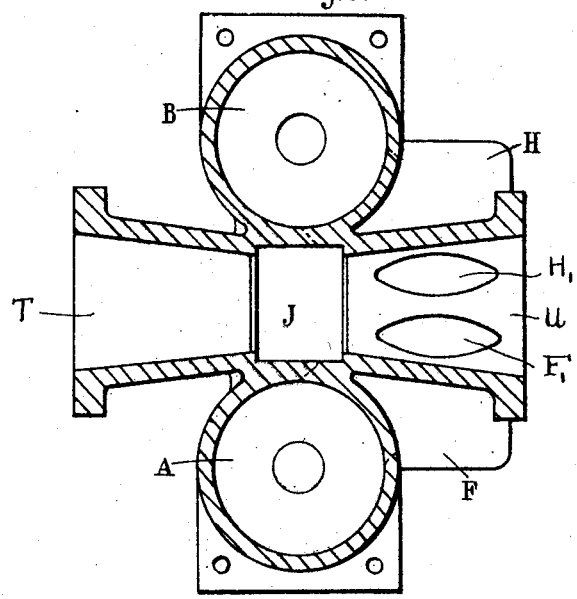
Figure 6 is a sectional plan on the line 6—6 of Figure 3.
Figure 8:
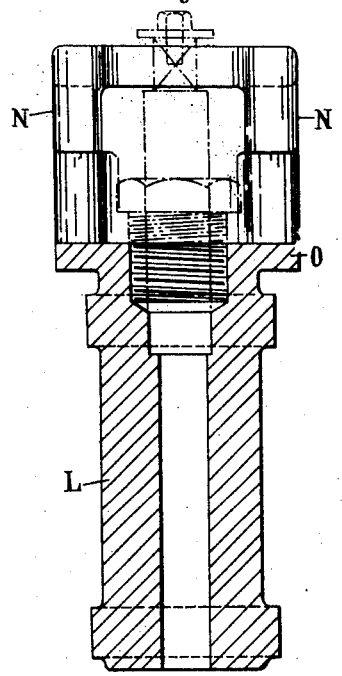
Figures 7 to 10 are respectively a plan, a sectional elevation, an elevation and a horizontal section (on an enlarged scale) of the sleeve in which the spindle of the operating handle works.
Figure 9:
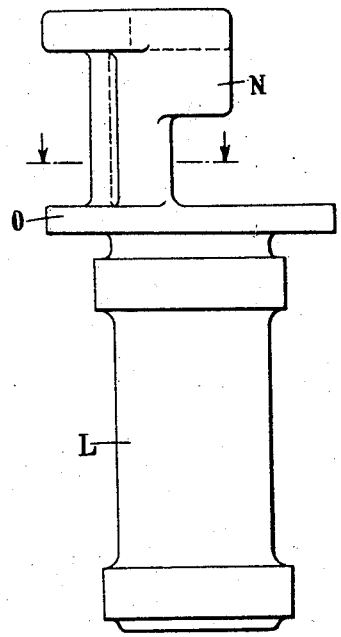
Figure 7:
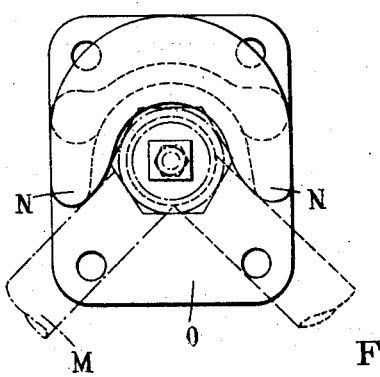
Figure 10:
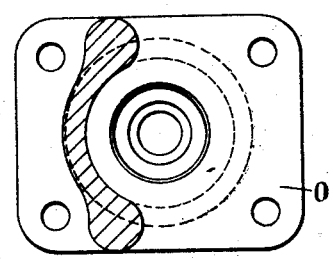
Figure 11:
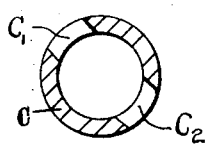
Figure 11 is a cross section of the inlet plug cock showing the ports therein.

For operating the device the smaller ends of the plug cocks are formed as bevel gear wheels $C_3$ $D_3$ which mesh with a third bevel gear wheel I in a gear chamber J between the plug cock seatings. The bevel wheel I is secured to a spindle K which passes through a guide or sleeve L and terminates in a square end to receive a readily accessible control bar or operating handle M (Fig. 7). This handle is movable angularly within limits determined by pillars or guard pieces N on the cap or cover plate O on the top of the sleeve L. It will of course be understood that when the handle is shifted angularly between the guard pieces N, the gear wheel I through gears $C_3$ $D_3$ turns the two cocks C and D equally in opposite directions and changes over the duty of filtering from one cylinder to the other as above described.

The top of each cylinder is closed by a cover plate held down by suitable means such as cross bars and a clamping screw P.

The location of the ports and the range of movement of the handle M are such that the flow of oil can never be entirely blocked but is divided between the two cylinders for intermediate positions of the handle. In either of its normal positions to the extreme right or extreme left the one or the other cylinder is idle.

In order to keep the plug cocks C and D well seated and on the other hand in order to allow them to recede or yield slightly when operated by the gear wheel I and thereby enable the movement of the handle M to be readily started without a great initial effort, the said plug cocks are yieldingly secured together by a spring controlled bolt Q.

The holes in the closed ends of the plug cocks through which the bolt Q passes are preferably large enough to enable the oil or other liquid to pass through and fill the gear chamber J so that its pressure acts upon the smaller ends of the plug cocks and thereby relieves the counter oil pressure and partially balances the cocks so that they do not bind too firmly in their seatings.

The outstanding advantages of my improved filter are the simplicity of manufacture, the simultaneous operation of the valves and the foolproof nature of their actuation and control so that no damage to the filters, pumps or other associated equipment can result from careless management.

What I claim and desire to secure by Letters Patent is:—

1. A filter for liquids comprising a plurality of cylinders each having an inlet port and an outlet port, a strainer in each cylinder, two conical plug valves each resiliently held in its seating and a single operating lever whereby a single manipulation of the valve mechanism changes over the flow of liquid from passing through one cylinder to passing through another.

2. A filter for liquids comprising a plurality of cylinders each having an inlet port and an outlet port, a strainer in each cylinder, two mutually converging co-axial conical plug valves each resiliently held in its seating and a single operating lever whereby a single manipulation of the valve mechanism changes over the flow of liquid from passing through one cylinder to passing through another.

3. A filter for liquids comprising a plurality of cylinders each having an inlet port and an outlet port, a strainer in each cylinder, two mutually converging co-axial conical plug valves resiliently connected together and a single operating lever whereby a single manipulation of the valve mechanism changes over the duty of filtering from one cylinder to another.

4. A filter comprising a plurality of cylinders each having an inlet port and an outlet port, a strainer in each cylinder, two mutually converging co-axial conical plug valves a spring controlled connecting nut and bolt resiliently connecting together said valves and a single valve operating lever whereby a single manipulation of the valve mechanism changes over the duty of filtering from one cylinder to another.

5. A filter for liquids comprising two cylinders each having an inlet port and an outlet port, a strainer in each cylinder, two conical plug valves resiliently held in their respective seatings and controlling the flow of liquid to and from the cylinders alternatively, a control bar, and gearing operatively connecting both valves and the control bar.

6. A filter for liquids comprising two cylinders each having an inlet port and an outlet port, a strainer in each cylinder, two double-ported hollow conical plug valves controlling the flow of liquid to and from the cylinders by way of said ports, gear teeth on said plug valves, a gear wheel intermeshing with said gear teeth, and means for angularly adjusting said gear wheel.

7. A filter for liquids comprising a plurality of cylinders each having an inlet port and an outlet port, a strainer in each cylinder, two partially hydraulically balanced conical plug valves means for resiliently seating said valves and a single operating handle whereby a single manipulation of the valve mechanism changes over the duty of filtering from one cylinder to another.

8. A duplex filter for liquids, comprising two cylinders side by side two co-axial and mutually converging conical valve seatings set in a plane at right angles to that containing the cylinder axes, passages between ports in the cylinders and ports in the valve seatings, double-ported hollow conical plug valves in said seatings controlling the flow of liquid to and from the cylinders alternatively, means resiliently drawing said valves towards each other the fluid pressure on said valves being partially balanced by acting on both sides thereof, a valve control bar, and means operatively connecting said valves with said control bar.

9. A duplex filter for liquids comprising two cylinders side by side, two co-axial and mutually converging conical valve seatings set in a plane at right angles to that containing the cylinder axes, passages between ports in the cylinders and ports in the valve seatings, double-ported hollow conical plug valves in said seatings controlling the flow of liquid to and from the cylinders alternatively, means resiliently drawing said valves towards each other the fluid pressure on said valves being partially balanced by acting on both sides thereof, gearing interconnecting said valves to rotate them simultaneously, a spindle connected to one element of said gearing, and a control bar for operating said spindle.

DANIEL EMIL ERICKSON.